United States Patent
Kitajima

(10) Patent No.: US 8,392,073 B2
(45) Date of Patent: Mar. 5, 2013

(54) AUTOMATIC LEVELING DEVICE AND AUTOMATIC LEVELING METHOD

(75) Inventor: Hiroki Kitajima, Iida (JP)

(73) Assignee: Omron Automotive Electronics Co., Ltd., Achi (JP)

( * ) Notice: Subject to any disclaimer, the term of this patent is extended or adjusted under 35 U.S.C. 154(b) by 736 days.

(21) Appl. No.: 12/572,038

(22) Filed: Oct. 1, 2009

(65) Prior Publication Data

US 2010/0091505 A1    Apr. 15, 2010

(30) Foreign Application Priority Data

Oct. 7, 2008    (JP) ................ P2008-260265

(51) Int. Cl.
*G06F 17/00*    (2006.01)
(52) U.S. Cl. .................... 701/49; 362/460; 362/465
(58) Field of Classification Search ............. 701/36, 701/49; 362/460, 464–466; 702/154; 315/76–77, 315/82
See application file for complete search history.

(56) References Cited

U.S. PATENT DOCUMENTS

| 5,893,894 | A  | * | 4/1999  | Moroto et al. ............. 701/53 |
| 6,183,118 | B1 | * | 2/2001  | Toda et al. ............... 362/465 |
| 6,229,263 | B1 | * | 5/2001  | Izawa ...................... 315/80 |
| 6,234,654 | B1 | * | 5/2001  | Okuchi et al. ............. 362/466 |
| 6,305,823 | B1 | * | 10/2001 | Toda et al. ............... 362/276 |
| 6,459,476 | B2 | * | 10/2002 | Nishimura ................. 356/5.01 |
| 6,480,806 | B1 | * | 11/2002 | Bilz et al. ................ 702/154 |

FOREIGN PATENT DOCUMENTS

| JP | 2001-191841 | 7/2001 |
| JP | 3782634     | 3/2006 |

* cited by examiner

*Primary Examiner* — Yonel Beaulieu
(74) *Attorney, Agent, or Firm* — Foley & Lardner LLP

(57) ABSTRACT

An automatic leveling device and automatic leveling method for being able to reduce an error caused by a hysteresis characteristic of an actuator are provided. A control ECU obtains vehicle height values from a front height sensor and a rear height sensor, computes a vehicle height difference from the vehicle height values, and a stroke amount to be corrected of an actuator 4 from the vehicle height difference. The control ECU supplies an instruction position signal based on the stroke amount and a hysteresis width such that the instruction position signal projects tentatively alternately out of a hysteresis range plural times in a reverse direction of an immediately preceding value. Therefore, every time the instruction position signal projects tentatively alternately out of the hysteresis range, a motor is started up again and stopped when the instruction position signal is finally matched with an actuator position signal.

5 Claims, 7 Drawing Sheets

AUTOMATIC LEVELING DEVICE AND AUTOMATIC LEVELING METHOD

This application claims priority from Japanese Patent Application P2008-260265, filed on Oct. 7, 2008. The entire content of the aforementioned application is incorporated herein by reference.

BACKGROUND OF THE INVENTION

1. Technical Field

The present invention relates to an automatic leveling device and an automatic leveling method for correcting an optical axis direction of a headlight of a vehicle.

2. Related Art

A vehicle height of a vehicle body is changed in a front-back direction by boarding of a passenger or loading and unloading, and sometimes the optical axis of the headlight is orientated upward compared with an initial state. A driver of an oncoming vehicle is easily dazzled when the optical axis of the headlight is orientated upward. Therefore, there is well known an automatic leveling device that detects an inclination of the vehicle to automatically correct the optical axis direction of the headlight (for example, see Japanese Patent No. 3782634).

In the automatic leveling device, an actuator is driven to adjust the optical axis direction of the headlight based on information concerning a vehicle height difference from front and rear height sensors. The actuator includes a motor that adjusts the inclination of a headlight reflector and a motor driver that drives the motor.

FIG. 8 is a conceptual view for explaining an operation example of an actuator in an automatic leveling device in the related art. In FIG. 8, a horizontal axis indicates elapsed time and a vertical axis indicates a voltage value fed into the actuator. That is, FIG. 8 illustrates the state in which the voltage value is relatively changed as time advances. One-to-one correlation holds between the voltage value fed into the actuator and the headlight reflector inclination adjustment that is of an output of the actuator. The actuator has a hysteresis characteristic in order to prevent frequent optical axis correction in consideration of a lifetime of the motor. A shaded portion of FIG. 8 indicates a hysteresis range. The motor is started up when an instruction position signal from a control ECU is set out of a hysteresis range, and the motor is stopped when the instruction position signal is matched with an actuator position signal indicating an actual position of the actuator.

In FIG. 8, because the instruction position signal once runs out of the hysteresis range, the movement of the actuator position signal is started from that point, and the movement is continued until the instruction position signal and the actuator position signal overlap each other. This is an example in which the intended correction can be performed. The hysteresis range is set in a constant range according to an occasional position of the actuator position signal. Accordingly, the hysteresis range is changed when the actuator position is moved.

FIGS. 9 and 10 are conceptual views for explaining another operation example of the actuator in the automatic leveling device in the related art. Thanks to the hysteresis characteristic, the motor movement caused by an unnecessary fluctuation of the instruction position signal is eliminated. At the same time, as illustrated in FIG. 9, when the instruction position signal does not run out of the hysteresis range, the actuator is not driven, and sometimes the intended correction cannot be performed. In order to avoid the event, there is well known a control method. As illustrated in FIG. 10, after the actuator is driven by once setting the instruction position signal out of the hysteresis range, the instruction position signal is set to the target value to be actually set again, and the actuator is driven to the originally intended position.

SUMMARY

For a lighting angle of the headlight, the inclination angle is obtained by measuring a lighting upper line to a vertical wall located ahead by 10 m, and the inclination angle is required to fall within a range of −0.90 to −2.10% based on a level plane. Although the hysteresis characteristic depends on the actuator, the hysteresis characteristic is up to about 4%. An influence of the hysteresis characteristic on the inclination angle becomes about 0.4%. That is, it is necessary that the accuracy for control fall within a range of 1.2%, and the hysteresis characteristic has the large influence.

However, in the related art, the state of the actuator cannot be recognized from the control ECU. Therefore, when update of the actuator position is started from the state in which the actuator position signal is not matched with the instruction position signal as illustrated in FIG. 11, the motor is stopped by the matching of the actuator position signal and the instruction position signal in operation, and unfortunately the actuator position cannot be changed to the target position to be updated.

The present invention has been devised to solve the problems described above, and an object thereof is to provide an automatic leveling device and an automatic leveling method for being able to reduce an error caused by the hysteresis characteristic of the actuator.

In accordance with one aspect of the present invention, the invention of claim 1 is directed to an automatic leveling device including: an actuator that inclines a headlight; and a control unit that drives and controls the actuator to correct an inclination of an optical axis of the headlight by supplying an instruction position signal to the actuator, the instruction position signal having a value based on a longitudinal inclination of a vehicle, wherein the control unit repeats alternately lower value instruction control and upper value instruction control predetermined times when the actuator is driven and controlled, the value of the instruction position signal being tentatively lowered to a value smaller than a value of an original instruction position in the lower value instruction control, the value of the instruction position signal being tentatively raised to a value larger than the value of the original instruction position in the upper value instruction control.

In the invention of claim 2, the automatic leveling device further includes an input unit that feeds a hysteresis characteristic of the actuator.

In the invention of claim 3, the automatic leveling device further includes a storage unit in which a hysteresis characteristic of the actuator is stored.

In accordance with another aspect of the present invention, the invention of claim 4 is directed to an automatic leveling control device, wherein an actuator that inclines a headlight is driven and controlled to correct an inclination of an optical axis of the headlight by supplying an instruction position signal to the actuator, the instruction position signal having a value based on a longitudinal inclination of a vehicle, and lower value instruction control and upper value instruction control are alternately repeated predetermined times when the actuator is driven and controlled, the value of the instruction position signal being tentatively lowered to a value smaller than a value of an original instruction position in the lower value instruction control, the value of the instruction position signal being tentatively raised to a value larger than the value of the original instruction position in the upper value instruction control.

In accordance with still another aspect of the present invention, the invention of claim 5 is directed to an automatic leveling method, wherein an actuator that inclines a headlight is driven and controlled to correct an inclination of an optical axis of the headlight by supplying an instruction position signal to the actuator, the instruction position signal having a value based on a longitudinal inclination of a vehicle, and lower value instruction control and upper value instruction control are alternately repeated predetermined times when the actuator is driven and controlled, the value of the instruction position signal being tentatively lowered to a value smaller than a value of an original instruction position in the lower value instruction control, the value of the instruction position signal being tentatively raised to a value larger than the value of the original instruction position in the upper value instruction control.

In driving and controlling the actuator, the control unit alternately repeats the lower value instruction control and the upper value instruction control predetermined times. In the lower value instruction control, the value of the instruction position signal based on the longitudinal inclination of the vehicle is tentatively lowered to the value smaller than the value corresponding to the original instruction position. In the upper value instruction control, the value of the instruction position signal is tentatively raised to the value larger than the value corresponding to the original instruction position. Therefore, every time the instruction position signal projects tentatively alternately out of the hysteresis range, the motor 4-2 is started up again, and the motor 4-2 is stopped when the instruction position signal is finally matched with the actuator position signal. Accordingly, the error generated by the hysteresis characteristic of the actuator can be reduced.

DETAILED DESCRIPTION

Figure 1:
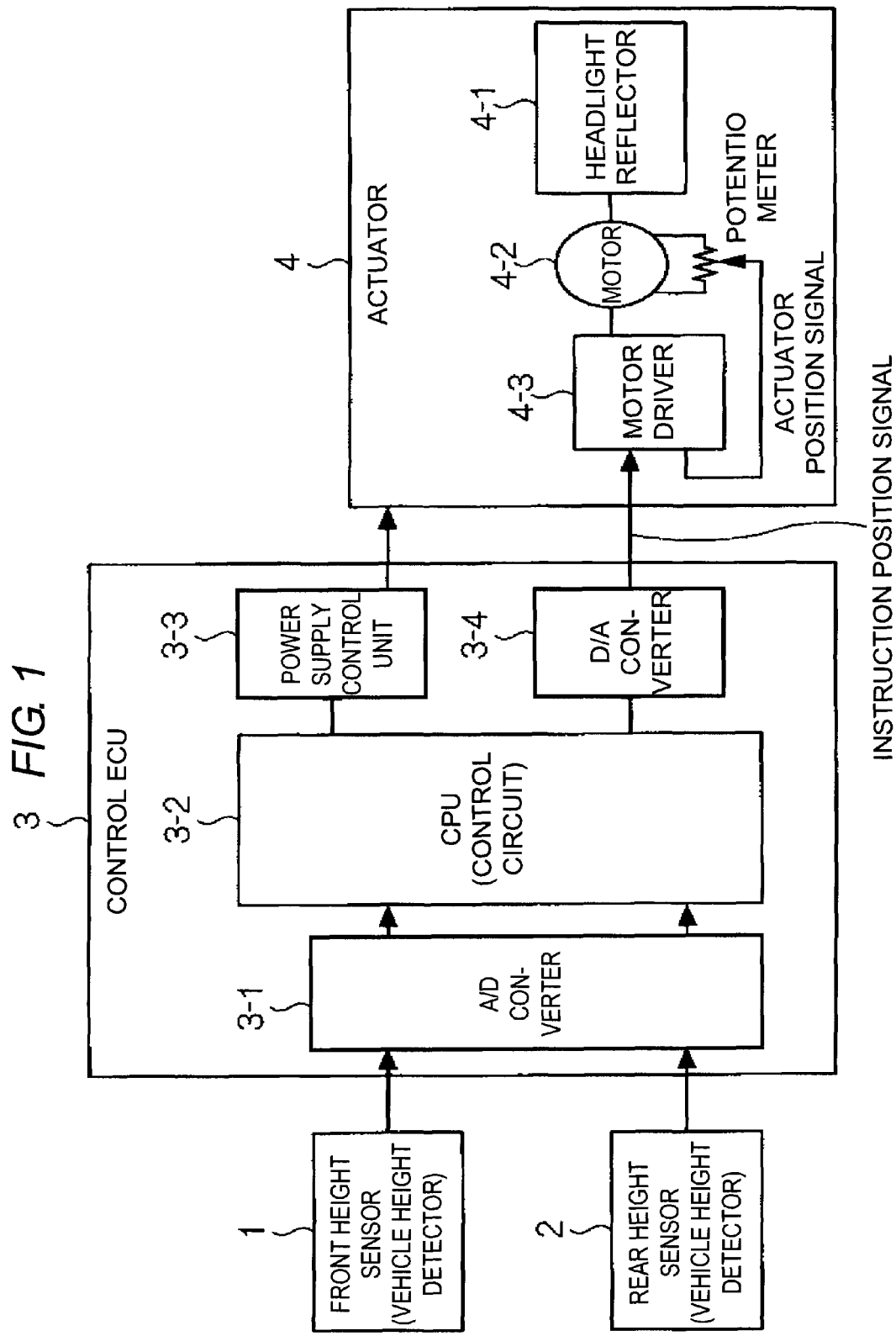
FIG. 1 is a block diagram illustrating an automatic leveling device according to a first embodiment of the invention.

Hereinafter, preferred embodiments of the present invention will be described with reference to the drawings. FIG. 1 is a block diagram illustrating an automatic leveling device according to a first embodiment of the invention. Referring to FIG. 1, the automatic leveling device includes a front height sensor (vehicle height detector) 1, a rear height sensor (vehicle height detector) 2, a control ECU 3, and an actuator 4. The front height sensor 1 supplies a detection signal (vehicle height value) to the control ECU 3 according to a vehicle height on a front side of a vehicle. The rear height sensor 2 supplies a detection signal (vehicle height value) to the control ECU 3 according to a vehicle height on a rear side of the vehicle. The height sensors (vehicle height detector) are not attached to the front and rear sides of the vehicle, but the height sensor may be attached to one of the front and rear sides of the vehicle.

The control ECU 3 includes an A/D converter 3-1, a CPU (control circuit) 3-2, a power supply control unit 3-3, and a D/A converter 3-4. The A/D converter 3-1 converts the detection signals corresponding to the vehicle height from the front height sensor 1 and rear height sensor 2 into digital signals and supplies the digital signals to the CPU 3-2. The CPU 3-2 computes a vehicle height difference from the front-side vehicle height value and rear-side vehicle height value, which are converted into the digital signals.

A relationship between the detected values of the front height sensor 1 and rear height sensor 2 and vehicle height values depends on mounting positions of the front height sensor 1 and rear height sensor 2 and a vehicle type. Therefore, the vehicle height difference is computed using a previously-measured relational expression for conversion or a map.

In order to correct an optical axis of a headlight, the CPU 3-2 obtains instruction position signal for setting actuator 4 to a target value from the computed vehicle height difference in order to correct the optical axis of the headlight, and the CPU 3-2 supplies the instruction position signal to the D/A converter 3-4. The instruction position signal obtaining method performed by the CPU 3-2 is described in detail later. The CPU 3-2 instructs the power supply control unit 3-3 to control a power supply for the actuator 4. The power supply control unit 3-3 controls the power supply for the actuator 4 according to the instruction from the CPU 3-2. The D/A converter 3-4 converts the instruction position signal into the digital signal and supplies the digital signal to the actuator 4.

The actuator 4 includes a headlight reflector 4-1, a motor 4-2, and a motor driver 4-3. The headlight reflector 4-1 is a reflecting mirror that reflects irradiation light of the headlight forward. The motor driver 4-3 drives and controls the motor 4-2 such that the instruction position signal from the control ECU 3 is matched with an actuator position signal fed back from a potentiometer that detects a rotational position of the motor 4-2, thereby expanding and contracting an output shaft connected to the headlight reflector 4-1. Therefore, the motor driver 4-3 adjusts an inclination of the headlight reflector 4-1 to adjust an optical axis deviation of the headlight. The optical axis deviation is generated by the vehicle height difference between the front side and the rear side.

Figure 2:
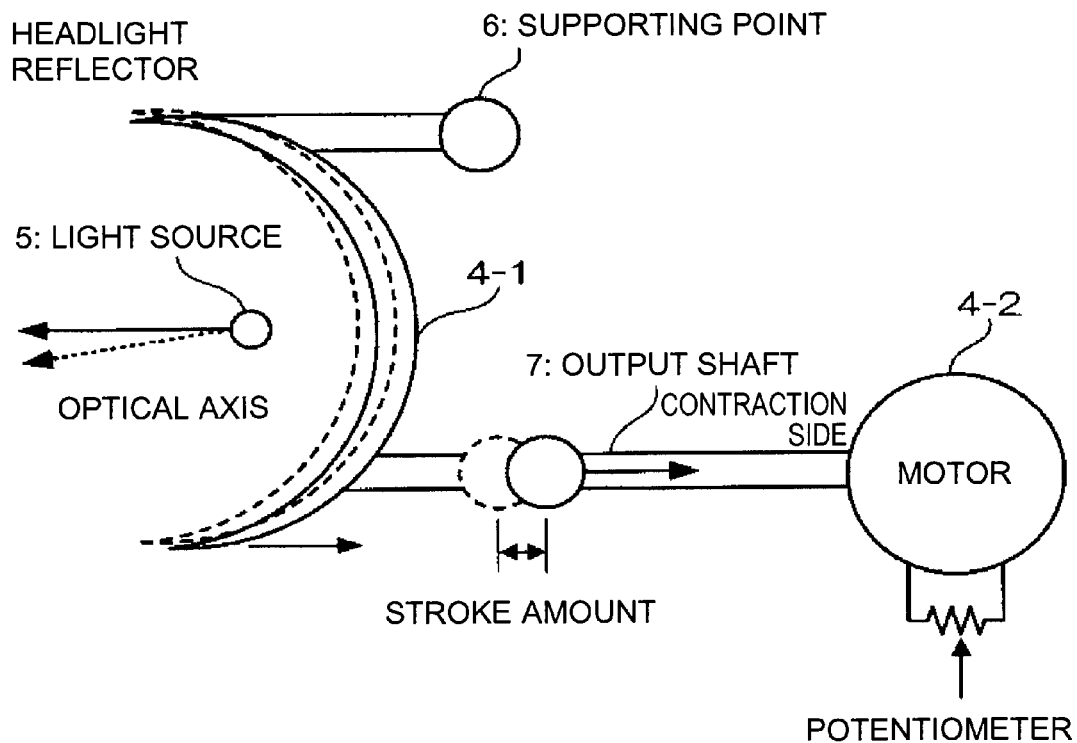
FIG. 2 is a schematic diagram for explaining a structure of an actuator of the first embodiment.

FIG. 2 is a schematic diagram for explaining a structure of an actuator of the first embodiment. Referring to FIG. 2, a light source 5 is disposed in a focal position of the headlight reflector 4-1. The light emitted from the light source 5 exits directly forward, and the light is also reflected from the headlight reflector 4-1 to exit forward.

An upper portion of the headlight reflector 4-1 is connected to a rotatable supporting point 6 with a shaft interposed therebetween. A lower portion of the headlight reflector 4-1 is connected to a rotating shaft of the motor 4-2 with an output shaft 7 interposed therebetween. That is, the motor 4-2 is driven to rotate the rotating shaft of the motor 4-2, which allows the output shaft 7 to be expanded and contracted. The headlight reflector 4-1 is inclined upward (broken line) and downward (solid line) by the expansion and contraction of the output shaft 7. The actuator position signal is expressed in terms of an expansion and contraction amount of the output shaft 7, that is, a stroke amount.

In the automatic leveling device of the first embodiment, the stroke amount is computed to correct the optical axis of the headlight based on the vehicle height difference information obtained from the vehicle height values of the front height sensor 1 and rear height sensor 2 in a front-back direction, and an instruction position signal (voltage value) corresponding to the stroke amount is supplied to the actuator 4. The actuator 4 expands and contracts the output shaft 7 with the motor 4-2 to adjust the inclination of the headlight reflector 4-1 such that the instruction position signal (voltage value) is matched with the actuator position signal (voltage value), thereby correcting the optical axis direction of the headlight.

At this point, as described above, in the related art, the control ECU 3 performs a hysteresis avoidance operation such that the motor 4-2 is not stopped before the stroke amount reaches the target value due to the hysteresis characteristic of the actuator 4 in timing of the update of the instruction position signal. The hysteresis avoidance operation means that the operation of the actuator is controlled such that the stroke amount finally reaches the target value by supplying the instruction position signal for projecting tentatively alternately out of the hysteresis range plural times in a reverse direction of the immediately preceding value.

Figure 3:
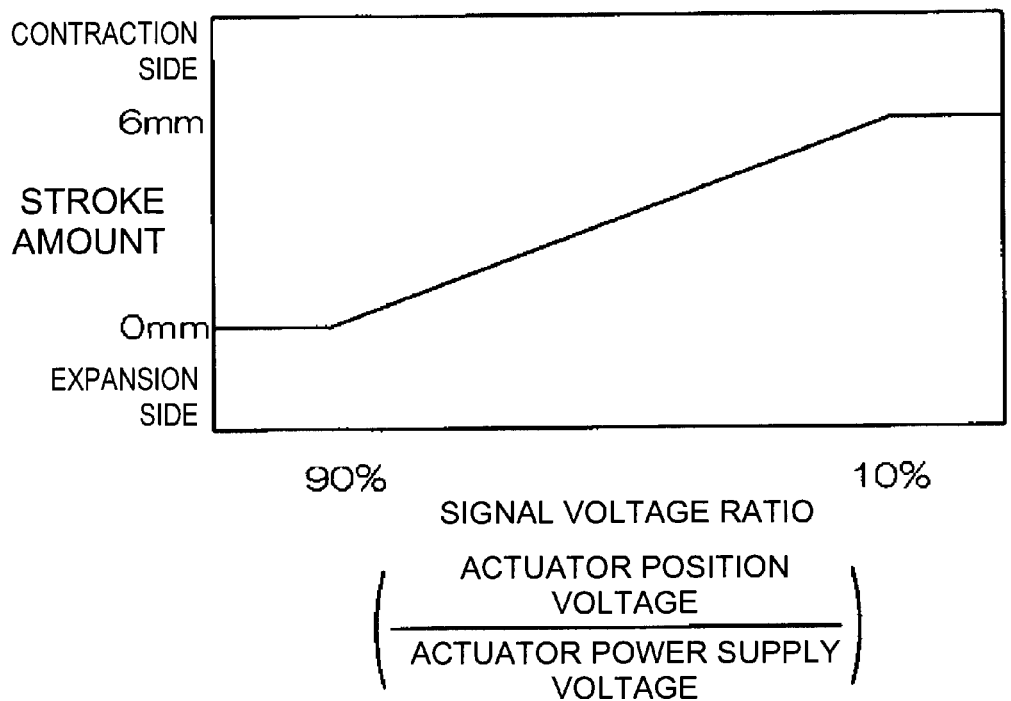
FIG. 3 illustrates an example of an actuator characteristic in the automatic leveling device of the first embodiment.

FIG. 3 illustrates an example of an actuator characteristic in the automatic leveling device of the first embodiment. In FIG. 3, the vertical axis indicates the stroke amount and the horizontal axis indicates a signal voltage ratio (actuator position voltage/actuator power supply voltage). The actuator 4 obtains the position (stroke amount) of the output shaft 7 as a feedback signal (actuator position signal) from the potentiometer, and the actuator 4 compares the actuator position signal and the instruction position signal from the control ECU 3.

The instruction position signal and the actuator position signal are expressed by a ratio to the power supply voltage of the actuator 4. The output shaft has a movable range of about 10% to about 90% in terms of the signal voltage ratio of the actuator position signal to the actuator power supply voltage. For example, because the position of the stroke of 6 mm is 10%, the actuator position signal becomes 1.2 V at the power supply voltage of 12 V.

The output voltage from the control ECU 3 and the stroke amount are expressed by the following table:

| output voltage from control ECU | stroke amount |
|---|---|
| 10.8 V (90%) | 0 mm |
| 6.0 V (50%) | 3 mm |
| 1.2 V (10%) | 6 mm |

Interpolation can be performed between the numeric values using the linear equation of FIG. 3. Specifically, assuming that X (V) is the output voltage and Y (mm) is the stroke amount, the following linear equation is obtained:

$$Y = 6 - 0.625(X - 1.2)$$
$$= -0.625X + 6.75.$$

However, FIGS. 2 and 3 illustrate an example of the correlation of X and Y. The invention is limited to the correlation of X and Y of FIGS. 2 and 3.

Figure 4:
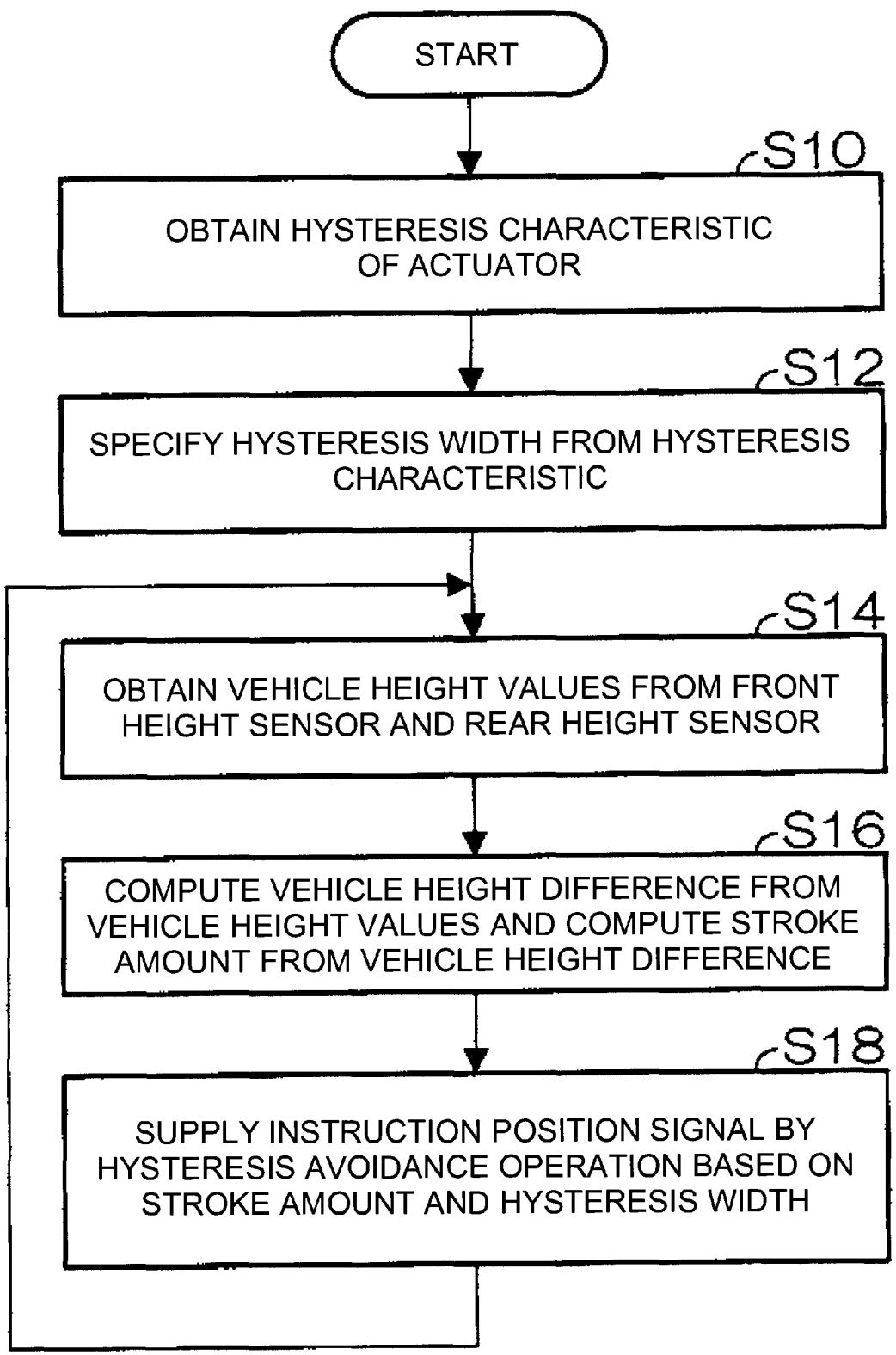
FIG. 4 is a flowchart for explaining an operation of the automatic leveling device of the first embodiment.

FIG. 4 is a flowchart for explaining an operation of the automatic leveling device of the first embodiment. The control ECU 3 obtains the hysteresis characteristic of the actuator 4 (step S10) and specifies the hysteresis width from the hysteresis characteristic (step S12). Because some hysteresis characteristics exist depending on actuator specifications, it is necessary for the control ECU 3 to initially set the hysteresis range of the mounted actuator 4.

In the first embodiment, in order that the control ECU 3 deals with the actuators 4 having different specifications, the initial setting is performed with a control pattern ("fluctuation range in hysteresis avoidance operation" larger than maximum assumed hysteresis range) that covers all the specifications or different control patterns corresponding to the fluctuation ranges are previously stored in the control ECU 3.

When the different control patterns are plurally stored, the setting is manually performed, or the specifications of the actuator 4 mounted on the vehicle are obtained from the vehicle through communication to switch the hysteresis range of the actuator 4 to the proper hysteresis range.

The control ECU 3 obtains the vehicle height values from the front height sensor 1 and the rear height sensor 2 (step S14). The control ECU 3 computes the vehicle height difference from the vehicle height values and computes the stroke amount to be corrected of the actuator 4 from the vehicle height difference (step S16).

The control ECU 3 to perform the hysteresis avoidance operation to supply the instruction position signal to the actuator 4 based on the stroke amount and the hysteresis width. In the hysteresis avoidance operation, lower value instruction control and upper value instruction control are alternately repeated predetermined times. In the lower value instruction control, the value of the instruction position signal is tentatively lowered to a value smaller than a value corresponding to the original instruction position. In the upper value instruction control, the value of the instruction position signal is tentatively raised to a value larger than the value corresponding to the original instruction position. Further, a difference between a lower value instructed in the lower value instruction control and an upper value instructed in the upper value instruction control is increased, and the control is performed such that the lower value or upper value runs out of the hysteresis range. For example, for the hysteresis width of 4.0% in terms of signal voltage ratio, the difference between the lower value and the upper value is set to about 6.0%. Therefore, every time the instruction position signal projects tentatively alternately out of the hysteresis range, the motor 4-2 is started up again, and the instruction position signal and the actuator position signal are finally matched with each other. Then the flow returns to step S14 to repeat the pieces of processing, thereby repeating the operation for correcting the optical axis of the headlight according to the vehicle height difference.

Figure 5:
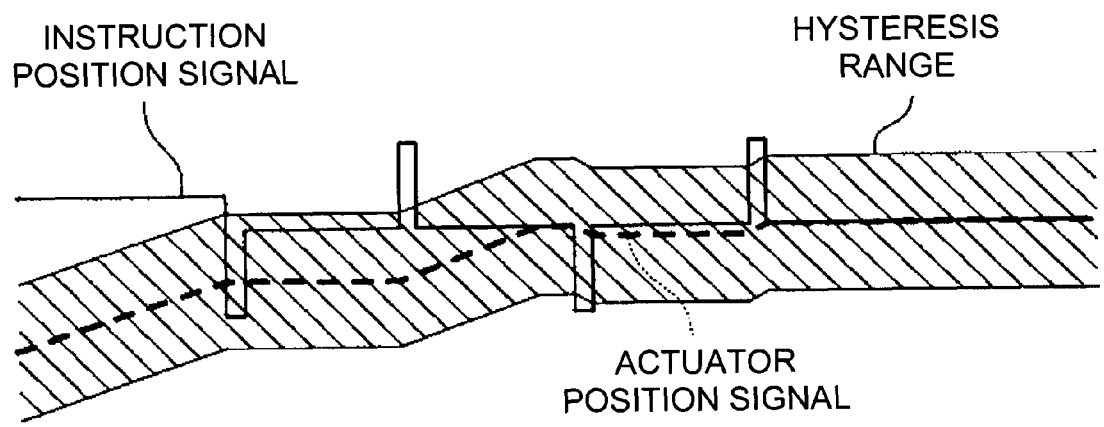
FIG. 5 is a conceptual view for explaining an operation example of the actuator in the automatic leveling device of the first embodiment.

FIG. 5 is a conceptual view for explaining an operation example of the actuator in the automatic leveling device of the first embodiment. In FIG. 5, the horizontal axis indicates the elapsed time, the vertical axis indicates the voltage value, the solid line indicates the instruction position signal, the broken line indicates the actuator position signal, and the shade portion indicates the hysteresis range. In the first embodiment, as described above, the hysteresis avoidance operation is performed such that the motor 4-2 is not stopped before the stroke amount reaches the target value due to the hysteresis characteristic of the actuator 4 in the timing of the update of the instruction position signal. In the hysteresis avoidance operation of FIG. 5, the lower value instruction control and the upper value instruction control are performed each two times.

In the actuator, by performing the hysteresis avoidance operation, the motor is started up again every time the instruction position signal projects out of the hysteresis range, and the motor is stopped when the instruction position signal is finally matched with actuator position signal. Therefore, in the first embodiment, the error generated by the hysteresis characteristic of the actuator can be reduced.

Figure 6:
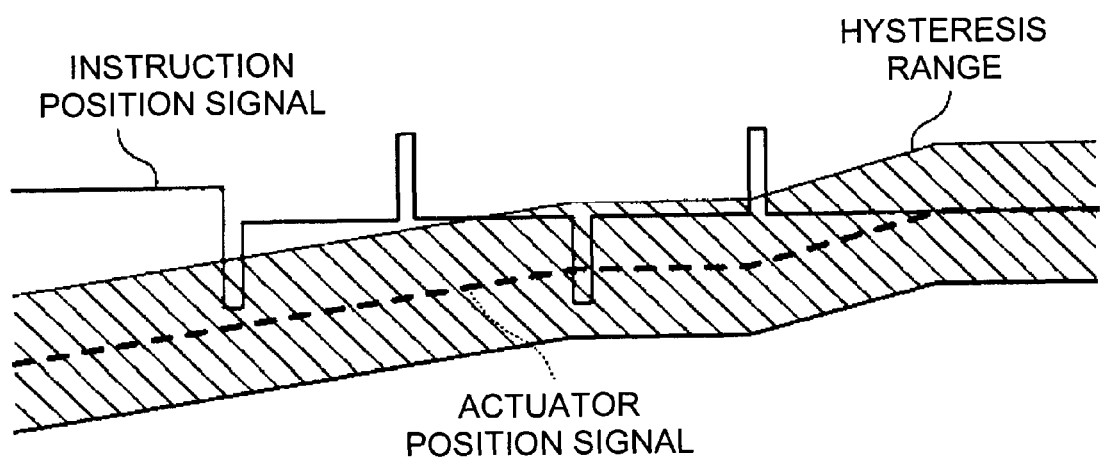
FIG. 6 is a conceptual view for explaining another operation of the actuator in the automatic leveling device of the first embodiment.

FIG. 6 is a conceptual view for explaining another operation of the actuator in the automatic leveling device of the first embodiment. As illustrated in FIG. 6, even if the instruction position signal is matched with (crosses to) the actuator position signal during the hysteresis avoidance operation, the hysteresis avoidance operation is continuously performed after that. Therefore, the motor is finally stopped in the position in response to the instruction position signal, so that the error generated by the hysteresis characteristic of the actuator can be avoided.

In the hysteresis avoidance operation as described above, a duration in which the instruction position signal projects tentatively out of the hysteresis range is set to about 1 ms or more in order to sufficiently move the actuator.

A second embodiment of the invention will be described below. In the first embodiment, because the motor is operated every hysteresis avoidance operation, possibly the hysteresis avoidance operation has an influence on a lifetime of the motor. Therefore, in the second embodiment, in order to avoid the event, the value of the instruction position signal is variable in the hysteresis avoidance operation when the instruction position signal projects plural times and outputs.

For example, in correcting the optical axis, the first-time value is set in the hysteresis avoidance operation so as to project sufficiently out of the hysteresis range. When the hysteresis width is 4.0% in terms of signal voltage ratio, the first-time value is set to about 6.0%. Further, after the first time, the values are set smaller than the hysteresis width in the hysteresis avoidance operation.

Figure 7:
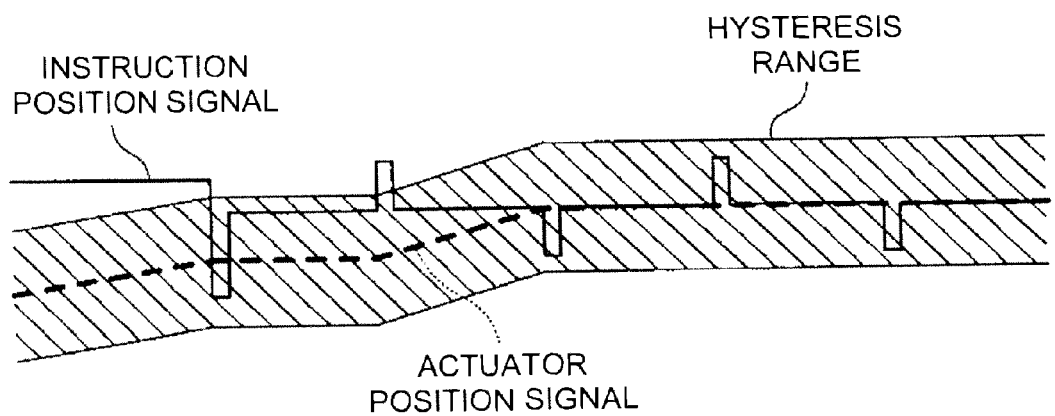
FIG. 7 is a conceptual view for explaining an operation of an actuator in an automatic leveling device according to a second embodiment of the invention.
Figure 8:
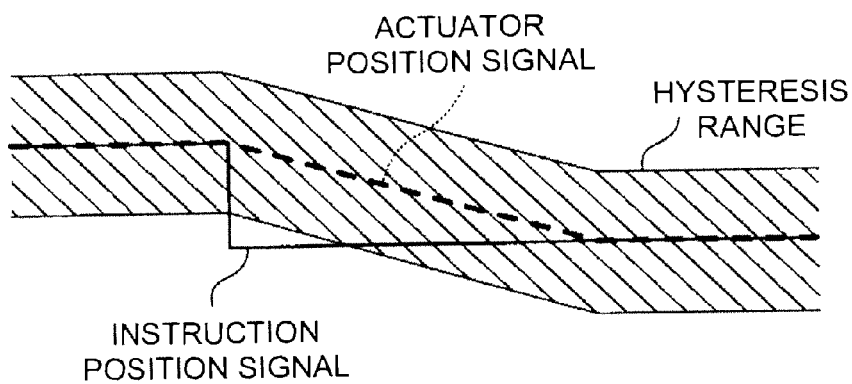
FIG. 8 is a conceptual view for explaining an operation example of an actuator in an automatic leveling device in the related art.
Figure 9:
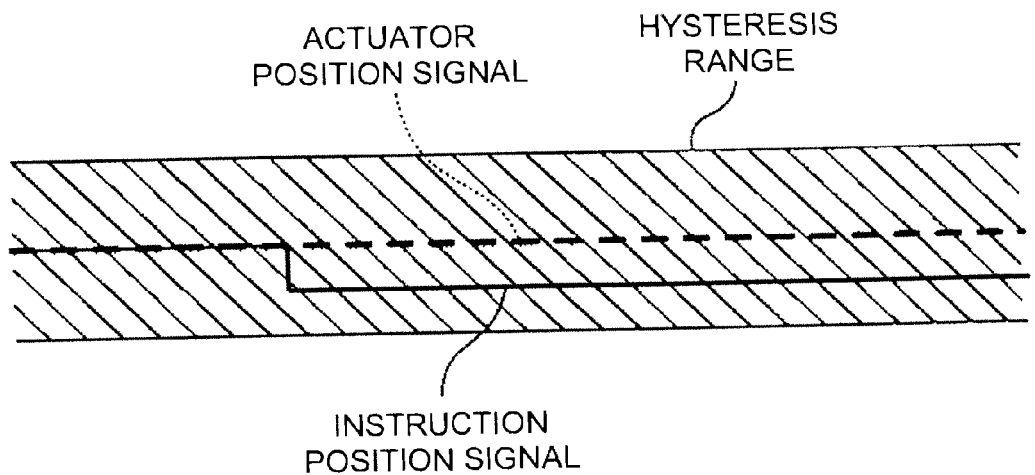
FIG. 9 is a conceptual view for explaining another operation example of the actuator in the automatic leveling device in the related art.
Figure 10:
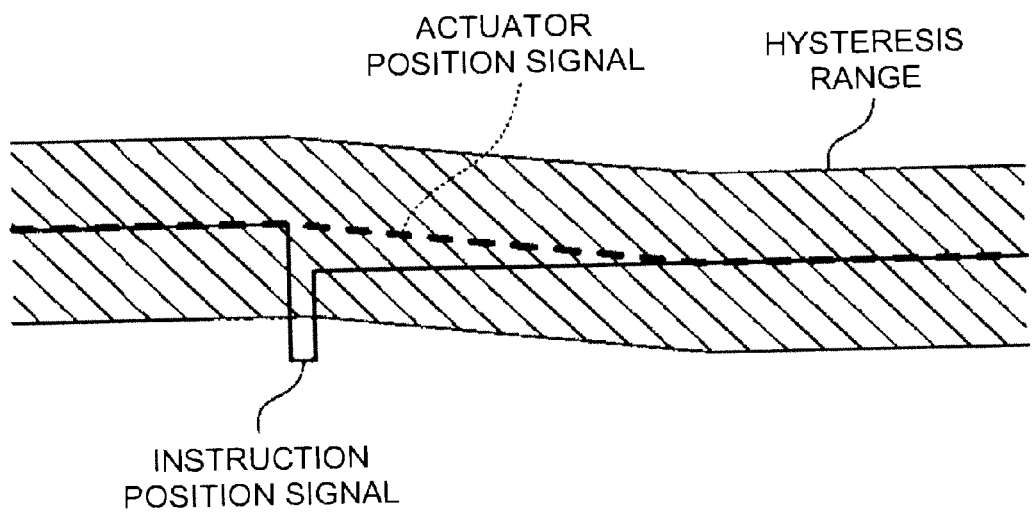
FIG. 10 is a conceptual view for explaining another operation example of the actuator in the automatic leveling device in the related art.
Figure 11:
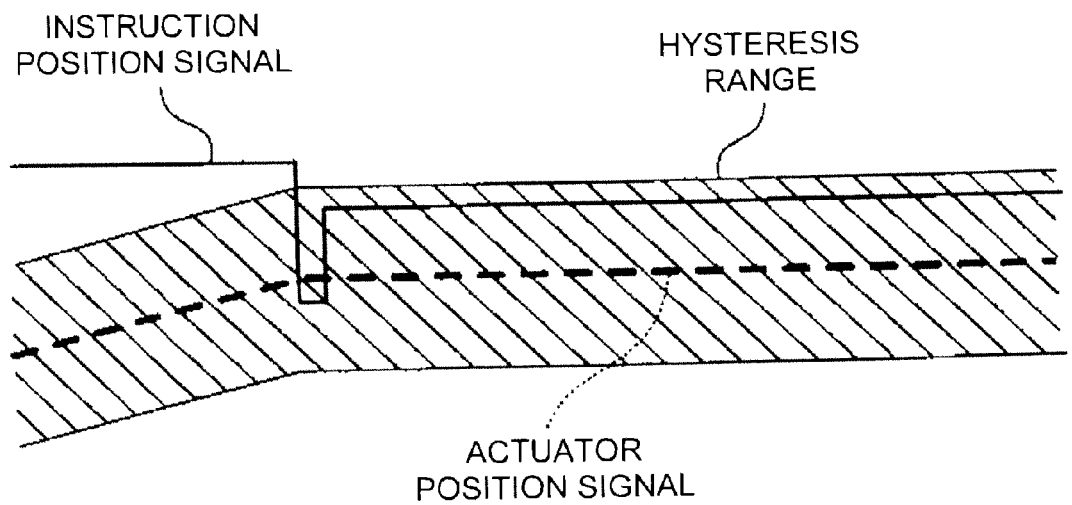
FIG. 11 is a conceptual view for explaining an operation that becomes troublesome in the automatic leveling device in the related art.

FIG. 7 is a conceptual view for explaining an operation of an actuator in an automatic leveling device of the second embodiment. As illustrated in FIG. 7, in the hysteresis avoidance operation, the value of the instruction position signal is set to a value in which the instruction position signal projects sufficiently out of the hysteresis range at the first time the instruction position signal projects out of the hysteresis range, and the value of the instruction position signal is set to a value smaller than the hysteresis width after the first time.

Thus, in the second embodiment, the value of the instruction position signal that projects out of the hysteresis range plural times is variable in the hysteresis avoidance operation, so that the error caused by the hysteresis can be reduced without moving the motor beyond the necessity.

However, in the hysteresis avoidance operation, the error reduction that is of the original aid is influenced when the value of the instruction position signal that projects out of the hysteresis range is set to an excessively smaller value after the first time. Accordingly, because the signal voltage ratio of 1% is an allowable range of the error, the value of the instruction position signal is set to about −1% of the hysteresis width.

In the first embodiment, "when the hysteresis width is 4.0% in terms of signal voltage ratio" means that the hysteresis width has a width of 0.48 V in each of the upper and lower portions when the signal voltage is 12 V similar to that of the general vehicle. On the other hand, in the second embodiment, the fluctuation range of the instruction position signal is "6%"=0.72 V for the first time, and the fluctuation range is "1% of hysteresis width"=3%=0.36 V for the second time and subsequent times.

What is claimed is:

1. An automatic leveling device comprising:
   an actuator configured to incline a headlight; and
   a control unit configured to drive and control the actuator to correct an inclination of an optical axis of the headlight by supplying an instruction position signal to the actuator, the instruction position signal having a value based on a longitudinal inclination of a vehicle,
   wherein when the actuator is driven and controlled, the control unit is configured to repeat alternately lower value instruction control and upper value instruction control predetermined times, and to supply the instruction position signals such that at least one of lower values and upper values of the instruction position signals runs out of a hysteresis range based on a hysteresis characteristic of the actuator, and
   wherein the value of the instruction position signal is lowered to a value smaller than a value of an original instruction position in the lower value instruction control, and the value of the instruction position signal is raised to a value larger than the value of the original instruction position in the upper value instruction control.

2. The automatic leveling device according to claim 1, further comprising an input unit configured to feed the hysteresis characteristic of the actuator.

3. The automatic leveling device according to claim 1, further comprising a storage unit in which the hysteresis characteristic of the actuator is stored.

4. An automatic leveling control device, wherein an actuator that inclines a headlight is driven and controlled to correct an inclination of an optical axis of the headlight by supplying an instruction position signal to the actuator, the instruction position signal having a value based on a longitudinal inclination of a vehicle, and
   when the actuator is driven and controlled, lower value instruction control and upper value instruction control are alternately repeated predetermined times, and the instruction position signals are supplied such that at least one of lower values and upper values of the instruction position signals runs out of a hysteresis range based on a hysteresis characteristic of the actuator, the value of the instruction position signal is lowered to a value smaller than a value of an original instruction position in the lower value instruction control, the value of the instruction position signal is raised to a value larger than the value of the original instruction position in the upper value instruction control.

5. An automatic leveling method, wherein an actuator that inclines a headlight is driven and controlled to correct an inclination of an optical axis of the headlight by supplying an instruction position signal to the actuator, the instruction position signal having a value based on a longitudinal inclination of a vehicle, and when the actuator is driven and controlled, lower value instruction control and upper value instruction control are alternately repeated predetermined times, and the instruction position signals are supplied such that at least one of lower values and upper values of the instruction position signals runs out of a hysteresis range based on a hysteresis characteristic of the actuator, the value of the instruction position signal is lowered to a value smaller than a value of an original instruction position in the lower value instruction control, the value of the instruction position signal is raised to a value larger than the value of the original instruction position in the upper value instruction control.

* * * * *